United States Patent
Lee et al.

(10) Patent No.: US 10,840,024 B2
(45) Date of Patent: Nov. 17, 2020

(54) MULTILAYER CAPACITOR

(71) Applicant: SAMSUNG ELECTRO-MECHANICS CO., LTD., Suwon-Si (KR)

(72) Inventors: Jong Pil Lee, Suwon-Si (KR); Jung Il Kim, Suwon-Si (KR); Jin Man Jung, Suwon-Si (KR); Young Key Kim, Suwon-Si (KR); Jin Kyung Joo, Suwon-Si (KR)

(73) Assignee: SAMSUNG ELECTRO-MECHANICS CO., LTD., Suwon-si (KR)

( * ) Notice: Subject to any disclaimer, the term of this patent is extended or adjusted under 35 U.S.C. 154(b) by 92 days.

(21) Appl. No.: 16/010,984

(22) Filed: Jun. 18, 2018

(65) Prior Publication Data

US 2019/0148073 A1     May 16, 2019

(30) Foreign Application Priority Data

Nov. 10, 2017 (KR) .................. 10-2017-0149826

(51) Int. Cl.
*H01G 4/30* (2006.01)
*H01G 4/008* (2006.01)
(Continued)

(52) U.S. Cl.
CPC .............. *H01G 4/30* (2013.01); *H01G 4/008* (2013.01); *H01G 4/012* (2013.01); *H01G 4/12* (2013.01); *H01G 4/232* (2013.01); *H01G 4/236* (2013.01)

(58) Field of Classification Search
CPC ............ H01G 4/12; H01G 2/065; H01G 2/24; H01G 4/0085; H01G 4/012; H01G 4/20;
(Continued)

(56) References Cited

U.S. PATENT DOCUMENTS

2009/0015986 A1* 1/2009 Togashi ................ H01G 4/012
                                                                361/321.4
2014/0293500 A1* 10/2014 Seo ......................... H01G 4/12
                                                                361/301.4
(Continued)

FOREIGN PATENT DOCUMENTS

JP     H11-067586 A     3/1999
JP     2006-100708 A    4/2006
(Continued)

OTHER PUBLICATIONS

Office Action issued in corresponding Korean Patent Application No. 10-2017-0149826 dated Aug. 20, 2019.
(Continued)

*Primary Examiner* — Michael P McFadden
(74) *Attorney, Agent, or Firm* — Morgan, Lewis & Bockius LLP

(57) ABSTRACT

A multilayer capacitor includes: a first internal electrode layer including first and second internal electrodes disposed to face each other with an insulating portion interposed therebetween; a second internal electrode layer including a third internal electrode and a lead portion connected to the third internal electrode; a body including the first and second internal electrode layers alternately disposed with respective dielectric layers interposed therebetween; first and second external electrodes disposed on the body to be connected to the first and second internal electrodes, respectively; and a third external electrode disposed on the body to be connected to the lead portion.

22 Claims, 19 Drawing Sheets

(51) Int. Cl.
*H01G 4/236* (2006.01)
*H01G 4/12* (2006.01)
*H01G 4/012* (2006.01)
*H01G 4/232* (2006.01)

(58) Field of Classification Search
CPC ........ H01G 4/2325; H01G 4/30; H01G 4/306; H01G 4/33
USPC ....................................................... 361/301.4
See application file for complete search history.

(56) References Cited

U.S. PATENT DOCUMENTS

| | | |
|---|---|---|
| 2014/0318844 A1 | 10/2014 | Kim et al. |
| 2014/0326494 A1 | 11/2014 | Chung et al. |
| 2015/0047886 A1 | 2/2015 | Kim |
| 2015/0068792 A1 | 3/2015 | Cho et al. |
| 2015/0287549 A1* | 10/2015 | Park ........................ H01G 2/065 361/270 |
| 2018/0226191 A1* | 8/2018 | Yoshida ................. H05K 1/111 |

FOREIGN PATENT DOCUMENTS

| | | |
|---|---|---|
| JP | 2008-118078 A | 5/2008 |
| JP | 2011-165776 A | 8/2011 |
| KR | 10-2014-0126945 A | 11/2014 |
| KR | 10-2014-0131794 A | 11/2014 |
| KR | 10-2015-0019732 A | 2/2015 |
| KR | 10-2015-0029225 A | 3/2015 |
| KR | 10-2015-0096909 A | 8/2015 |

OTHER PUBLICATIONS

Korean Office Action dated Feb. 21, 2019 issued in Korean Patent Application No. 10-2017-0149826 (with English translation).

* cited by examiner

I - I'

I - I'

MULTILAYER CAPACITOR

CROSS-REFERENCE TO RELATED APPLICATION(S)

This application claims the benefit of priority to Korean Patent Application No. 10-2017-0149826 filed on Nov. 10, 2017, in the Korean Intellectual Property Office, the disclosure of which is incorporated herein by reference in its entirety.

TECHNICAL FIELD

The present disclosure relates to a multilayer capacitor.

BACKGROUND

Among ceramic electronic components, a multilayer ceramic capacitor (MLCC) has the advantages of small size, high capacitance, and ease of mountability.

The multilayer ceramic capacitor is a chip type condenser mounted on the circuit boards of various electronic products such as display devices including liquid crystal displays (LCDs), plasma display panels (PDPs), and the like, computers, personal digital assistants (PDAs), mobile phones, and the like, and serving to charge or discharge electricity.

The multilayer ceramic capacitor has various sizes and stacking forms depending on uses and capacitance thereof.

Particularly, in accordance with the recent trend toward miniaturization, lightness, and multifunctionality of electronic products, multilayer ceramic capacitors used in electronic products have also been required to have a small size and high capacitance, and to boost voltage.

Therefore, a multilayer ceramic capacitor in which thicknesses of dielectric layers and internal electrodes are thin for microminiaturization of the electronic product and the dielectric layers are stacked in as large a number as possible for super high capacitance of the electronic product has been manufactured.

However, a technology capable of mounting such a micro-sized capacitor in accordance with super-miniaturization of the capacitor is not secured, such that it may be difficult to actually apply such a capacitor to a product.

SUMMARY

An aspect of the present disclosure may provide a multilayer capacitor capable of securing a high degree of freedom in mounting while having a small size and high capacitance.

According to an aspect of the present disclosure, a multilayer capacitor may include: a first internal electrode layer including first and second internal electrodes disposed to face each other with an insulating portion interposed therebetween; a second internal electrode layer including a third internal electrode and a lead portion connected to the third internal electrode; a body including the first and second internal electrode layers alternately disposed with respective dielectric layers interposed therebetween; first and second external electrodes disposed on the body to be connected to the first and second internal electrodes, respectively; and a third external electrode disposed on the body to be connected to the lead portion.

According to another aspect of the present disclosure, a multilayer capacitor may include: a first internal electrode layer including first and second internal electrodes disposed to face each other with a first insulating portion interposed therebetween; a second internal electrode layer including a third internal electrode and a lead portion connected to the third internal electrode; a third internal electrode layer including a dummy electrode and a fourth internal electrode disposed to face each other with a second insulating portion interposed therebetween; a body including the first, second and third internal electrode layers alternately disposed with respective dielectric layers interposed therebetween; a first external electrode disposed on the body to be connected to the first internal electrode; a second external electrode disposed on the body to be connected to the second and fourth internal electrodes; and a third external electrode disposed on the body to be connected to the lead portion, wherein the dummy electrode is insulated from the first, second and third external electrodes.

BRIEF DESCRIPTION OF DRAWINGS

The above and other aspects, features, and advantages of the present disclosure will be more clearly understood from the following detailed description taken in conjunction with the accompanying drawings, in which.

DETAILED DESCRIPTION

Figure 1:
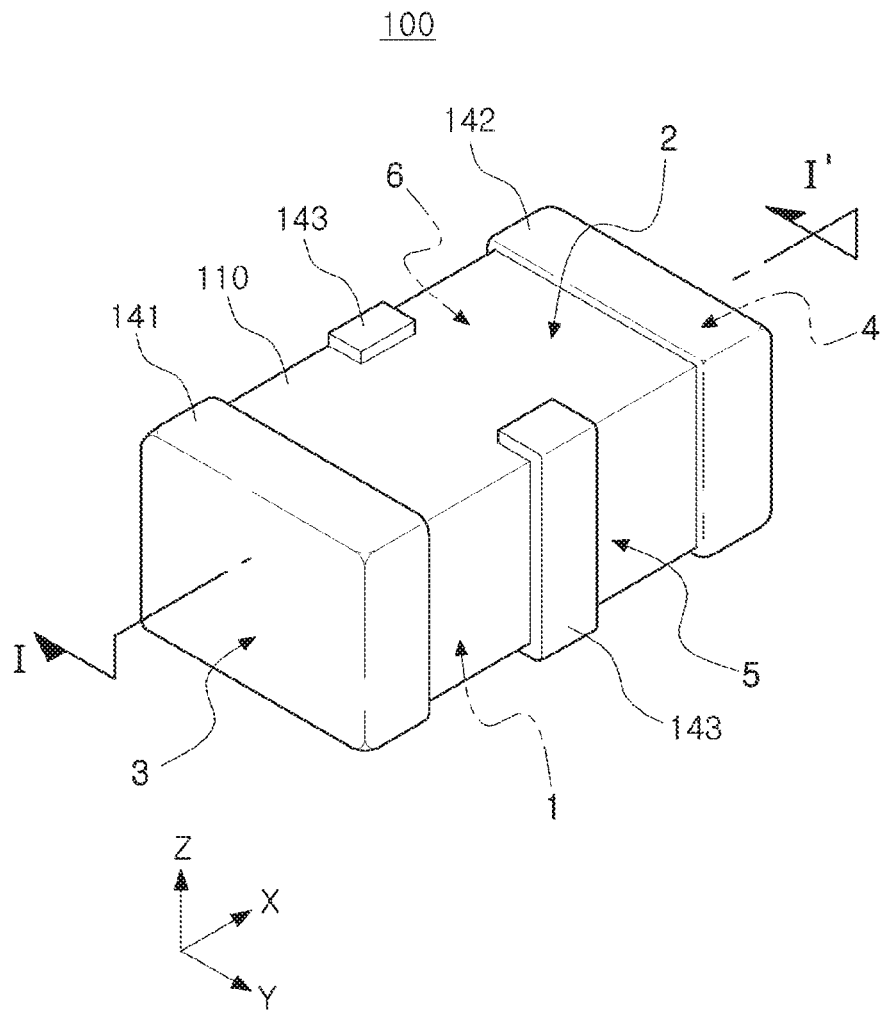
FIG. 1 is a perspective diagram schematically illustrating a multilayer capacitor according to an exemplary embodiment in the present disclosure.

Hereinafter, exemplary embodiments of the present disclosure will now be described in detail with reference to the accompanying drawings. In the accompanying drawings, shapes, sizes, and the like, of components may be exaggerated or stylized for clarity.

The present disclosure may, however, be exemplified in many different forms and should not be construed as being limited to the specific embodiments set forth herein. Rather these embodiments are provided so that this disclosure will be thorough and complete, and will fully convey the scope of the disclosure to those skilled in the art.

The term "an exemplary embodiment" used herein does not refer to the same exemplary embodiment, and is provided to emphasize a particular feature or characteristic different from that of another exemplary embodiment. However, exemplary embodiments provided herein are considered to be able to be implemented by being combined in whole or in part one with another. For example, one element described in a particular exemplary embodiment, even if it is not described in another exemplary embodiment, may be understood as a description related to another exemplary embodiment, unless an opposite or contradictory description is provided therein.

The meaning of a "connection" of a component to another component in the description includes an indirect connection through a third component as well as a direct connection between two components. In addition, "electrically connected" means the concept including a physical connection and a physical disconnection. It can be understood that when an element is referred to with "first" and "second", the element is not limited thereby. They may be used only for a purpose of distinguishing the element from the other elements, and may not limit the sequence or importance of the elements. In some cases, a first element may be referred to as a second element without departing from the scope of the claims set forth herein. Similarly, a second element may also be referred to as a first element.

Herein, an upper portion, a lower portion, an upper side, a lower side, an upper surface, a lower surface, and the like, are decided in the accompanying drawings. For example, a first connection member is disposed on a level above a redistribution layer. However, the claims are not limited thereto. In addition, a vertical direction refers to the above-mentioned upward and downward directions, and a horizontal direction refers to a direction perpendicular to the above-mentioned upward and downward directions. In this case, a vertical cross section refers to a case taken along a plane in the vertical direction, and an example thereof may be a cross-sectional view illustrated in the drawings. In addition, a horizontal cross section refers to a case taken along a plane in the horizontal direction, and an example thereof may be a plan view illustrated in the drawings.

Terms used herein are used only in order to describe an exemplary embodiment rather than limiting the present disclosure. In this case, singular forms include plural forms unless interpreted otherwise in context.

In the accompanying drawings, an X direction may refer to a first direction or a length direction, a Y direction may refer to a second direction or a width direction, and a Z direction may refer to a third direction, a thickness direction, or a stacking direction.

Figure 2:
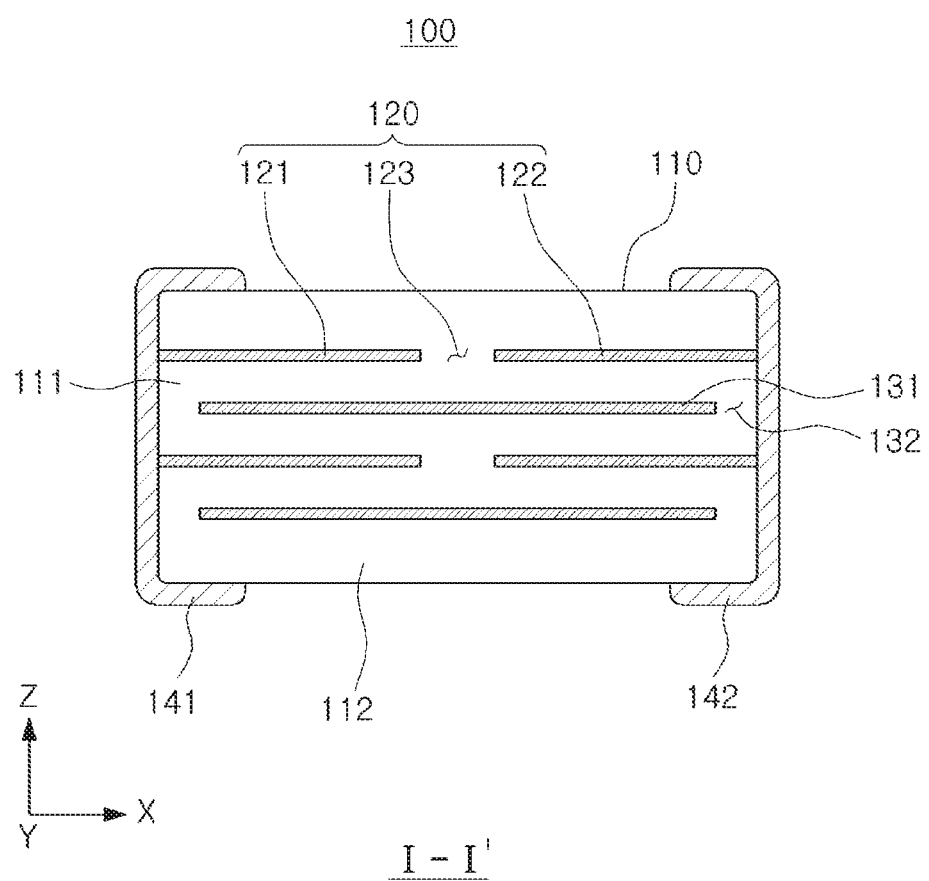
FIG. 2 is a cross-sectional diagram taken along line I-I' of FIG. 1.
Figure 3A:
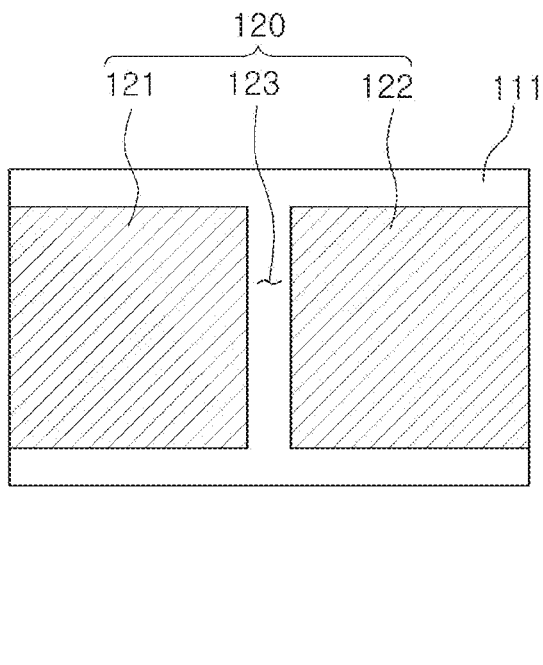
FIG. 3A is a diagram illustrating a ceramic sheet for forming a first internal electrode layer of FIG. 2.
Figure 3B:
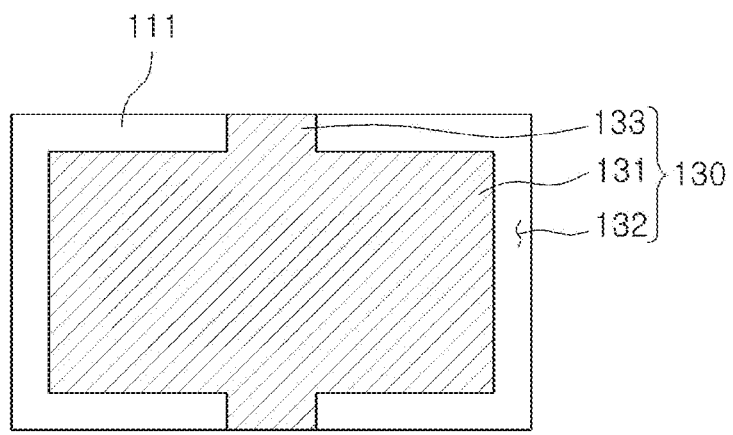
FIG. 3B is a diagram illustrating a ceramic sheet for forming a second internal electrode layer of FIG. 2.
Figure 3C:
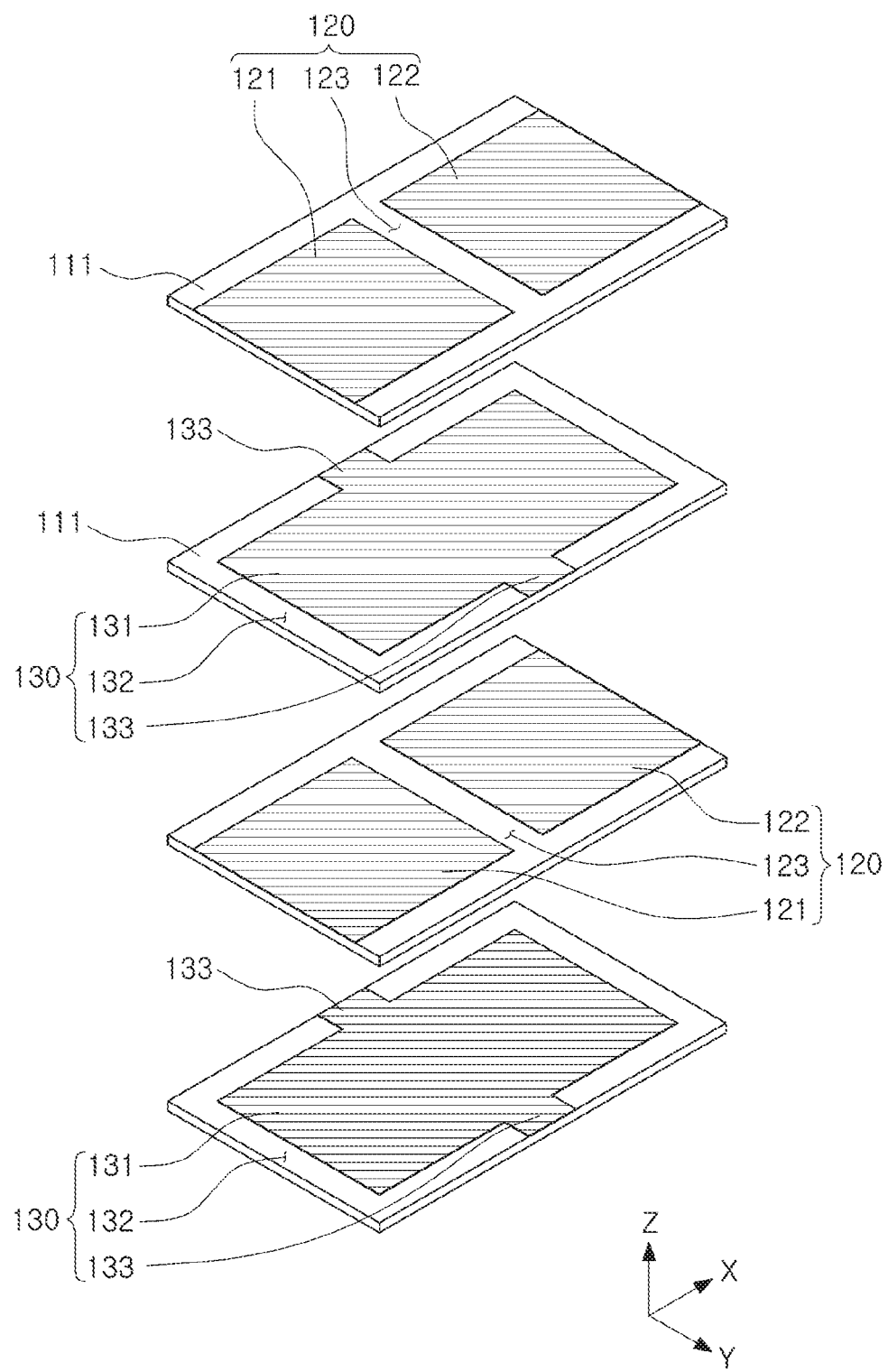
FIG. 3C is a diagram illustrating a stacking method for manufacturing the multilayer capacitor of FIG. 2.

FIG. 1 is a perspective diagram schematically illustrating a multilayer capacitor according to an exemplary embodiment in the present disclosure. FIG. 2 is a cross-sectional diagram taken along line I-I' of FIG. 1. FIG. 3A is a diagram illustrating a ceramic sheet for forming a first internal electrode layer of FIG. 2. FIG. 3B is a diagram illustrating a ceramic sheet for forming a second internal electrode layer of FIG. 2. FIG. 3C is a diagram illustrating a stacking method for manufacturing the multilayer capacitor of FIG. 2.

Referring to FIGS. 1 and 2, a multilayer capacitor 100 according to the exemplary embodiment in the present disclosure may include a body 110 and first, second and third external electrodes 141, 142 and 143 respectively.

The body 110 may include an active region as a part contributing to forming capacitance of the capacitor and upper and lower covers 112 disposed on upper and lower surfaces of the active region as upper and lower margin parts.

According to the exemplary embodiment, a shape of the body 110 is not particularly limited, but may be substantially a hexahedral shape.

That is, the body 110 does not have a perfect hexahedral shape due to a difference in thickness depending on arrangement of internal electrodes and polishing of edge portions, and may have a shape substantially close to a hexahedral shape.

Directions of a hexahedron will be defined in order to clearly describe exemplary embodiments of the present disclosure. Both surfaces of the body 110 opposing each other in the Z direction will be defined as first and second surfaces 1 and 2, both surfaces of the body 110 connected to the first and second surfaces 1 and 2 and opposing each other in the X direction will be defined as third and fourth surfaces 3 and 4, and both surfaces of the body 110 connected to the first and second surfaces 1 and 2 and the third and fourth surfaces 3 and 4 and opposing each other in the Y direction will be defined as fifth and sixth surfaces 5 and 6. Here, the first surface 1 may be a mounting surface.

Referring to FIG. 3C, the active region may have a structure in which a plurality of dielectric layers 111 and a plurality of first and second internal electrode layers 120 and 130 disposed with respective dielectric layers 111 interposed therebetween are alternately stacked.

The active region may include a first active region in which first and third internal electrodes 121 and 131 overlap each other to form capacitance and a second active region in which second and third internal electrodes 122 and 131 overlap each other to form capacitance. Therefore, the multilayer capacitor 100 may have the same effect as connecting two capacitors to each other, such that at the time of mounting the multilayer capacitor 100, a process may be simplified, and a mounting area may be decreased. Further, as described below, capacitance by the first active region and capacitance by the second active region may be differently designed, such that capacitors having more various capacitances may be implemented.

The dielectric layer 111 may contain a ceramic powder having high permittivity, for example, a barium titanate ($BaTiO_3$) based powder or strontium titanate ($SrTiO_3$) based powder, or the like, but is not limited thereto.

Here, a thickness of the dielectric layer 111 may be optionally changed depending on a capacitance design of the multilayer capacitor 100. Considering of a size and capacitance of the body 110, a thickness of a single dielectric layer may be 0.1 to 10 μm after sintering, but is not limited thereto.

The first internal electrode layer 120 may include the first and second internal electrodes 121 and 122 disposed to face each other with an insulating portion 123 interposed therebetween.

Referring to FIG. 3A, the first and second internal electrodes 121 and 122 may be formed by printing a conductive paste containing a conductive metal on the dielectric layer 111 at a predetermined thickness, the first internal electrode 121 may be formed to be exposed to the third surface 3 of the body 110, the second internal electrode 122 may be formed to be exposed to the fourth surface 4 of the body 110, and the first and second internal electrodes 121 and 122 may be insulated from each other by the insulating portion 123 interposed therebetween. That is, the first internal electrode 121 may be exposed to one of both surfaces of the body 110 in the length (X) direction, and the second internal electrode 122 may be exposed to the other surface of the body 110 opposing the surface thereof to which the first internal electrode 121 is exposed.

The first and second internal electrodes 121 and 122 as described above may be electrically connected to the first and second external electrodes 141 and 142 formed on the body 110, respectively.

The second internal electrode layer 130 includes the third internal electrode 131 and a lead portion 133 connected to the third internal electrode 131. The second internal electrode layer 130 may include a space 132 spaced apart from the third and fourth surfaces 3 and 4 of the body 110 so that the third internal electrode 131 may be insulated from the first and second external electrodes 141 and 142.

Referring to FIG. 3B, the third internal electrode 131 may be formed by printing a conductive paste containing a conductive metal on the dielectric layer 111 at a predetermined thickness, and be formed not to be exposed to the outside of the body 110. That is, the third internal electrode 131 may be formed to be spaced apart from the third to sixth surfaces of the body 110 by a predetermined distance.

The lead portion 133 may be formed by printing a conductive paste containing a conductive metal on the dielectric layer 111 at a predetermined thickness, and be formed to be connected to the third internal electrode and exposed to any one of both surfaces of the body 110 in the width (Y) direction. Here, the lead portion 133 may include a first lead portion connected to the third internal electrode 131 and exposed to the fifth surface 5 of the body 110 and a second lead portion connected to the third internal electrode 131 and exposed to the sixth surface 6 of the body 110, such that the lead portion 133 may be exposed to both surfaces of the body 110 in the width (Y) direction.

The third internal electrode 131 may be electrically connected to the third external electrode 143 formed on the body 110 through the lead portion 133.

A thickness of the first, second and third internal electrodes 121, 122, and 131 may be determined depending on the use thereof. For example, the thickness may be determined in a range of 0.2 to 1.0 μm in consideration of the size and capacitance of the body 110, but is not limited thereto.

Further, the conductive metal contained in the first, second and third internal electrodes 121, 122, and 131 may be nickel (Ni), copper (Cu), palladium (Pd), or an alloy thereof, but is not limited thereto.

The upper and lower covers 112 may have the same material and configuration as those of the dielectric layer 111 of the active region except that internal electrodes are not included therein.

That is, the upper and lower covers 112 may be formed by stacking a single or two or more dielectric layers on the upper and lower surfaces of the active region in the Z direction, respectively, and serve to prevent the first, second and third internal electrodes 121, 122, and 131 from being damaged by physical or chemical stress.

The first and second external electrodes 141 and 142 may be disposed on the body to be connected to the first and second internal electrodes 121 and 122, respectively. In a capacitor according to the related art, provided to decrease equivalent series inductance (ESL), first and second external electrodes are electrically connected to each other through internal electrodes, but in the multilayer capacitor according to the present disclosure, the first and second internal electrodes 121 and 122 are insulated from each other by the insulating portion 123. Therefore, the multilayer capacitor according to the present disclosure may be used in a state in which the first and second external electrodes 141 and 142 are not electrically connected to each other, such that the multilayer capacitor may be variously utilized.

The first and second external electrodes 141 and 142 may be disposed to face each other on both surfaces of the body 110 in the length (X) direction.

The third external electrode 143 may be disposed on the body 110 to be connected to the lead portion 133. The third external electrode 143 may be connected to the lead portion 133 connected to the third internal electrode 131, such that the third external electrode 143 may be electrically connected to the third internal electrode 131.

The third external electrode 143 may be disposed on at least one of both surfaces of the body 110 in the width (Y) direction and may also be formed on both surfaces 5 and 6 of the body 110 as illustrated in FIG. 1.

Further, the third external electrode 143 may be formed to enclose the surfaces of the body except for both surfaces 3 and 4 of the body in the length (X) direction and be spaced apart from the first and second external electrodes 141 and 142.

Here, the first, second and third external electrodes 141 to 143 may be insulated from each other. However, it should be noted that this does not exclude a case in which the external electrodes are connected to each other directly through an external circuit.

With the capacitor according to the present disclosure, a capacitor having various capacitances may be implemented depending on what electrodes or terminals the first, second and third external electrodes are designed as.

Figure 12:
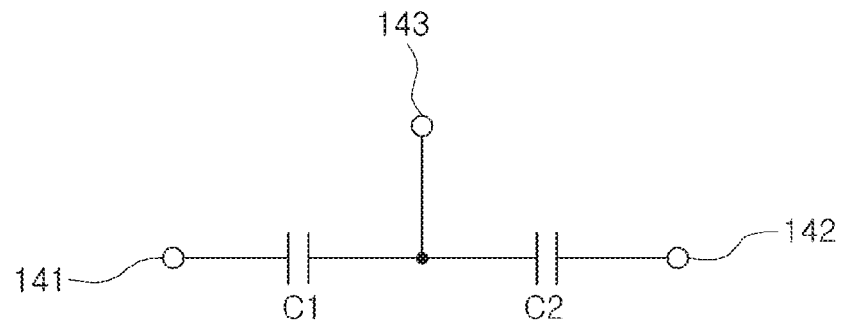
FIG. 12 is a basic circuit diagram of a capacitor according to an exemplary embodiment in the present disclosure.

FIG. 12 is a basic circuit diagram of a 3-terminal capacitor according to an exemplary embodiment in the present disclosure. As described above, the active region may include the first active region in which the first and third internal electrodes 121 and 131 overlap each other to form capacitance and the second active region in which the second and third internal electrodes 122 and 131 overlap each other to form capacitance, and the multilayer capacitor may have the same effect as connecting a capacitor having capacitance C1 formed by the first active region and a capacitor having capacitance C2 formed by the second active region to each other.

Referring to FIG. 12, in a case of floating the second external electrode 142 and setting the first external electrode 141 as an input terminal and the third external electrode 143 as an output terminal, the capacitor having the capacitance C1 may be implemented.

In a case of floating the first external electrode 141 and setting the second external electrode 142 as an input terminal and the third external electrode 143 as an output terminal, the capacitor having the capacitance C2 may be implemented.

Figure 13:
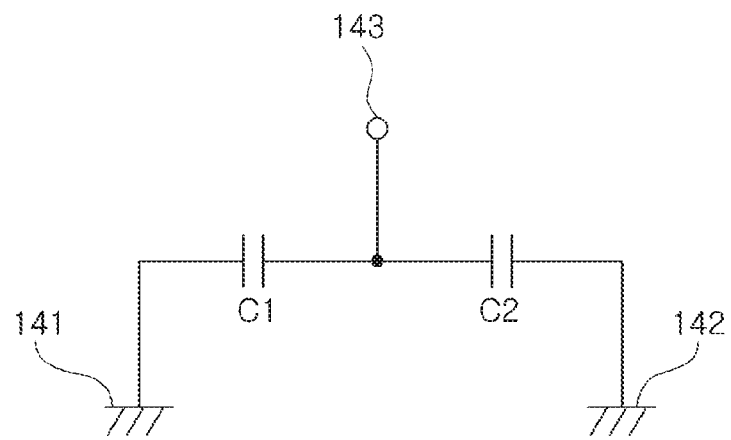
FIG. 13 illustrates a circuit configured to allow the multilayer capacitor according to the exemplary embodiment in the present disclosure to have the same effect as connecting two capacitors to each other in parallel.
Figure 14:
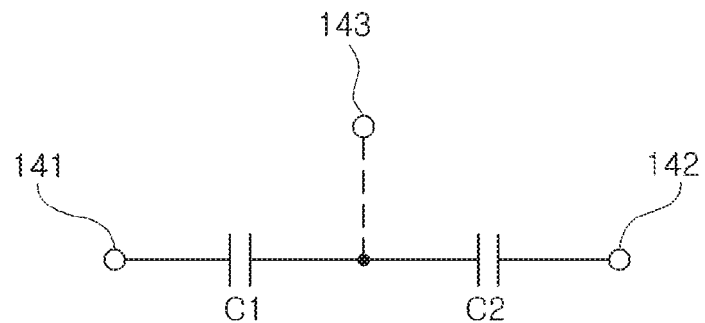
FIG. 14 illustrates a circuit configured to allow the multilayer capacitor according to the exemplary embodiment in the present disclosure to have the same effect as connecting two capacitors to each other in series.

FIG. 13 illustrates a circuit configured to allow the multilayer capacitor according to the exemplary embodiment in the present disclosure to have the same effect as connecting two capacitors to each other in parallel. FIG. 14 illustrates a circuit configured to allow the multilayer capacitor according to the exemplary embodiment in the present disclosure to have the same effect as connecting two capacitors to each other in series.

In a case of setting the first and second external electrodes 141 and 142 as ground (GND) terminals and the third external electrode 143 as a signal terminal as illustrated in FIG. 13, two capacitors having capacitances C1 and C2 may be connected to each other in parallel, such that a capacitor of which total capacitance is C1+C2 may be implemented.

In a case of floating the third external electrode and setting the first external electrode 141 as an input terminal and the second external electrode 142 as an output terminal as illustrated in FIG. 14, two capacitors having capacitances C1 and C2 may be connected to each other in series, such that a capacitor of which total capacitance is C1*C2/(C1+C2) may be implemented.

Further, the same effect as connecting two capacitors having different capacitances to each other may be secured according to various exemplary embodiments described below, and thus, a degree of freedom in design may be further improved.

Figure 4:
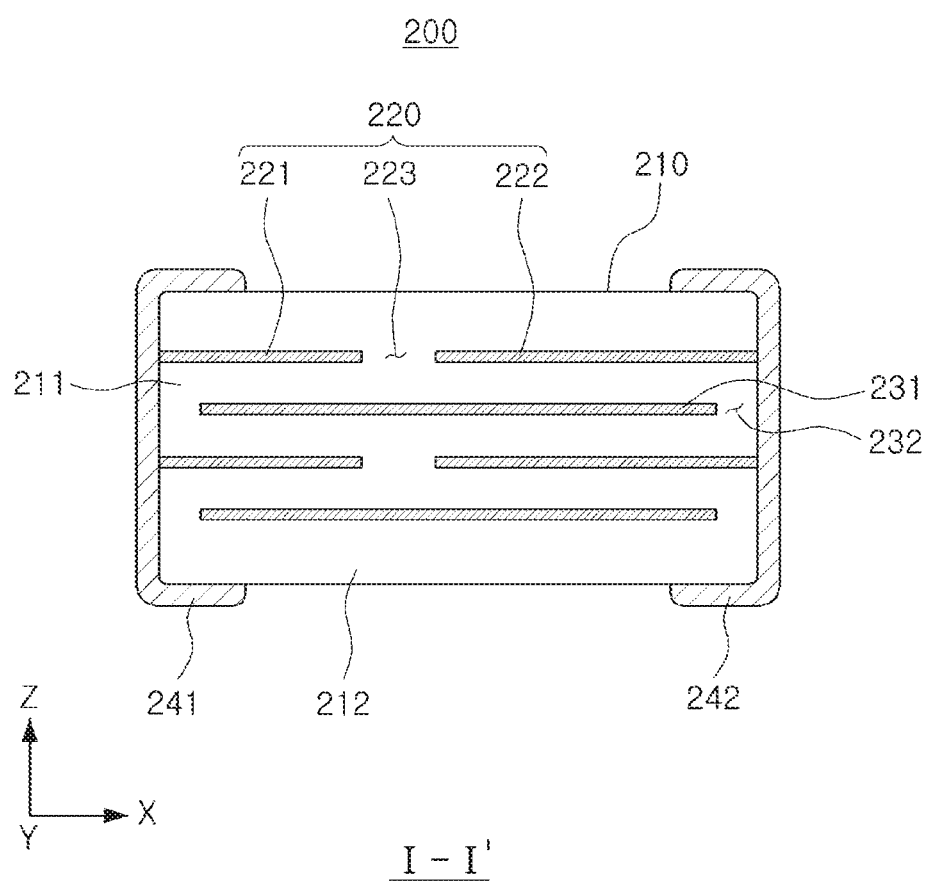
FIG. 4 is a cross-sectional diagram of a multilayer capacitor according to another exemplary embodiment in the present disclosure, taken along line I-I'.
Figure 5A:
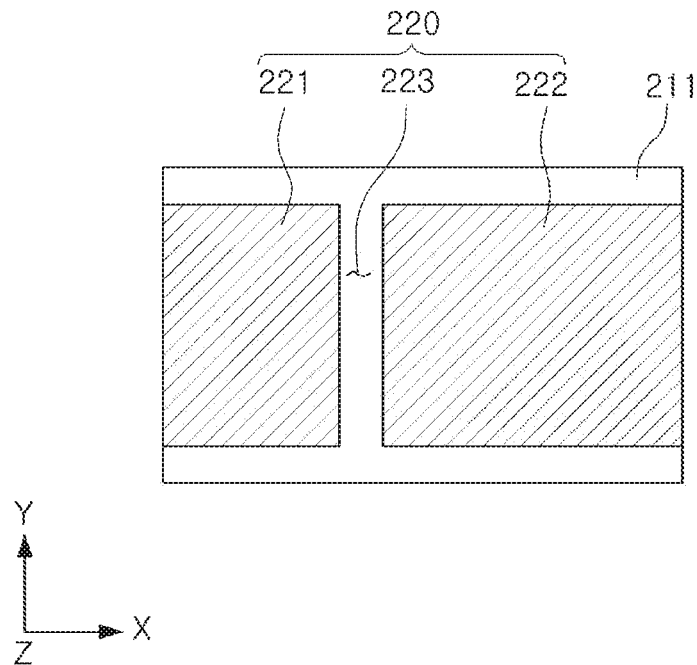
FIG. 5A is a diagram illustrating a ceramic sheet for forming a first internal electrode layer of FIG. 4.
Figure 5B:
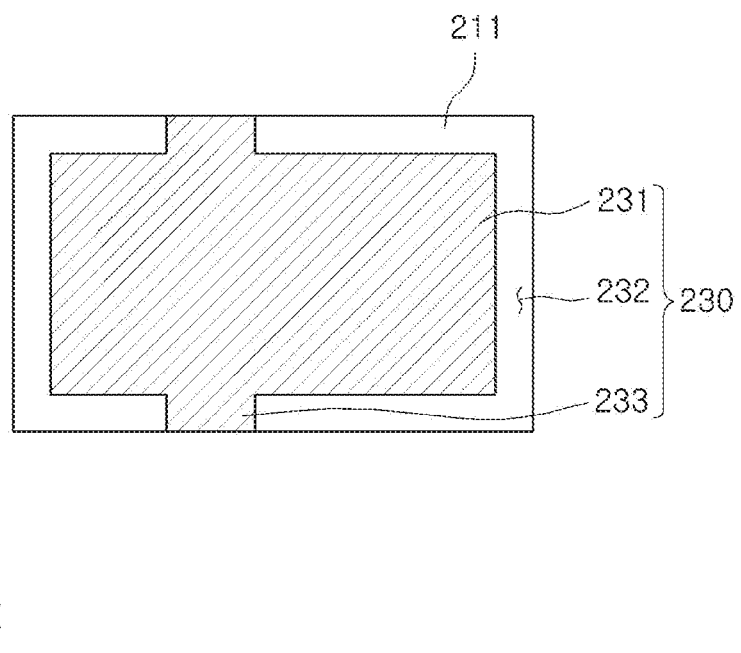
FIG. 5B is a diagram illustrating a ceramic sheet for forming a second internal electrode layer of FIG. 4.
Figure 5C:
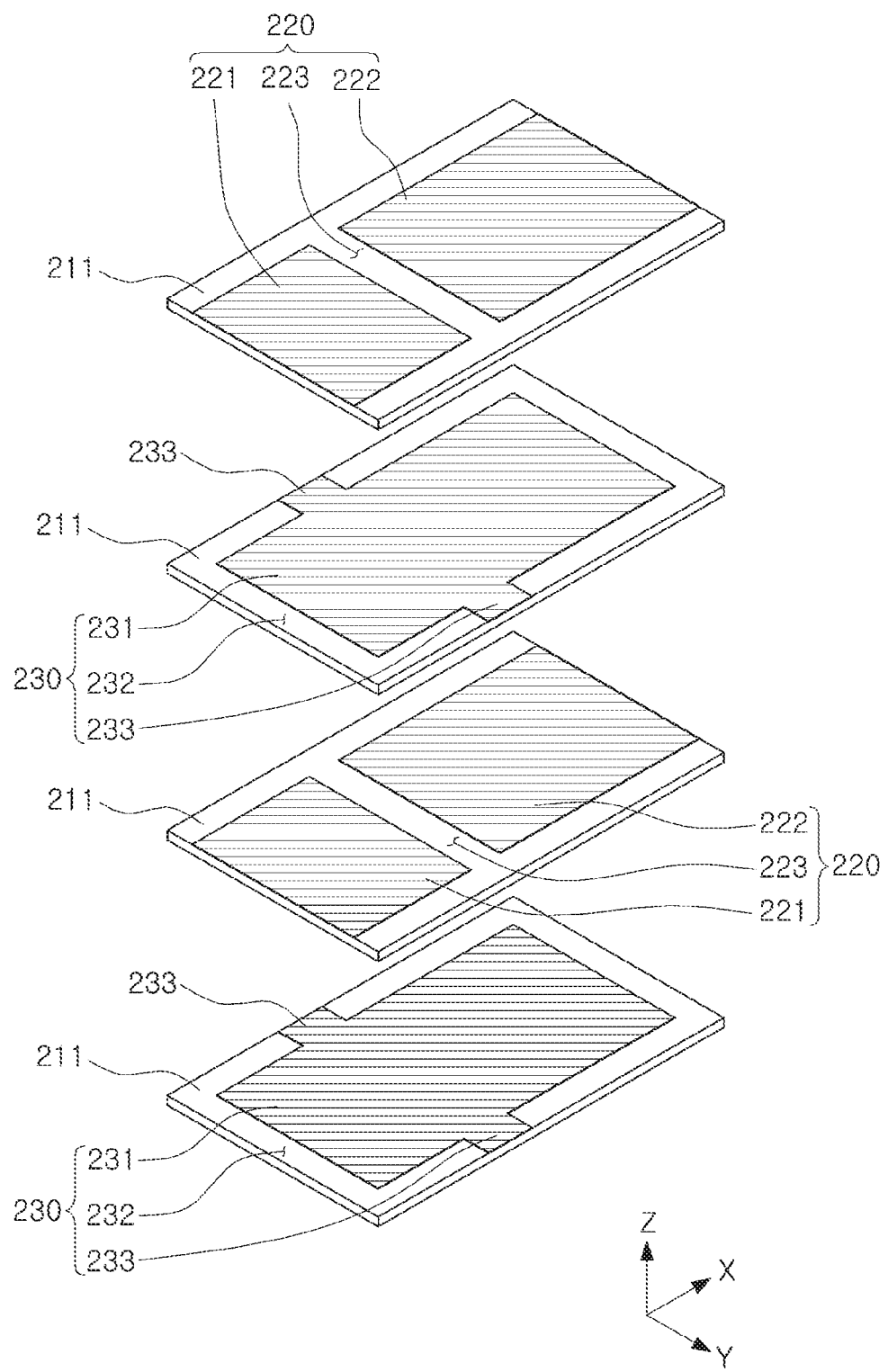
FIG. 5C is a diagram illustrating a stacking method for manufacturing the multilayer capacitor of FIG. 4.

FIG. 4 is a cross-sectional diagram of a multilayer capacitor 200 according to another exemplary embodiment in the present disclosure, taken along line I-I'. FIG. 5A is a diagram illustrating a ceramic sheet for forming a first internal electrode layer of FIG. 4. FIG. 5B is a diagram illustrating a ceramic sheet for forming a second internal electrode layer of FIG. 4. FIG. 5C is a diagram illustrating a stacking method for manufacturing the multilayer capacitor of FIG. 4.

Referring to FIGS. 4 through 5C, in the multilayer capacitor 200 according to another exemplary embodiment in the present disclosure, an area of an overlapping portion between first and third internal electrodes 221 and 231 may be different from an area of an overlapping portion between second and third internal electrodes 222 and 231.

The area of the overlapping portion between first and third internal electrodes 221 and 231 and the area of the overlapping portion between second and third internal electrodes 222 and 231 may be controlled depending on desired capacitance by allowing areas of the first and second internal electrodes 221 and 222 to be different from each other as illustrated in FIG. 5A, such that the multilayer capacitor 200 may have the same effect as connecting two capacitors having different capacitances to each other.

A lead portion 233 may be formed in a central portion of a body 210 in a length (X) direction, but the lead portion 233 may be formed in a position at which an insulating portion of the first internal electrode layer 220 is formed in the body 210 in the length direction as illustrated in FIGS. 5A through 5C, such that first and second active regions may be easily distinguished from each other.

That is, the lead portion 233 may be exposed to any one of both surfaces of the body 210 in a width (Y) direction, and an exposure position thereof may be biased toward the third or fourth surface 3 or 4 of the body 210. Therefore, a third external electrode 243 connected to the lead portion 233 may also be formed in a position biased toward the third or fourth surface 3 or 4 of the body 210.

Figure 6:
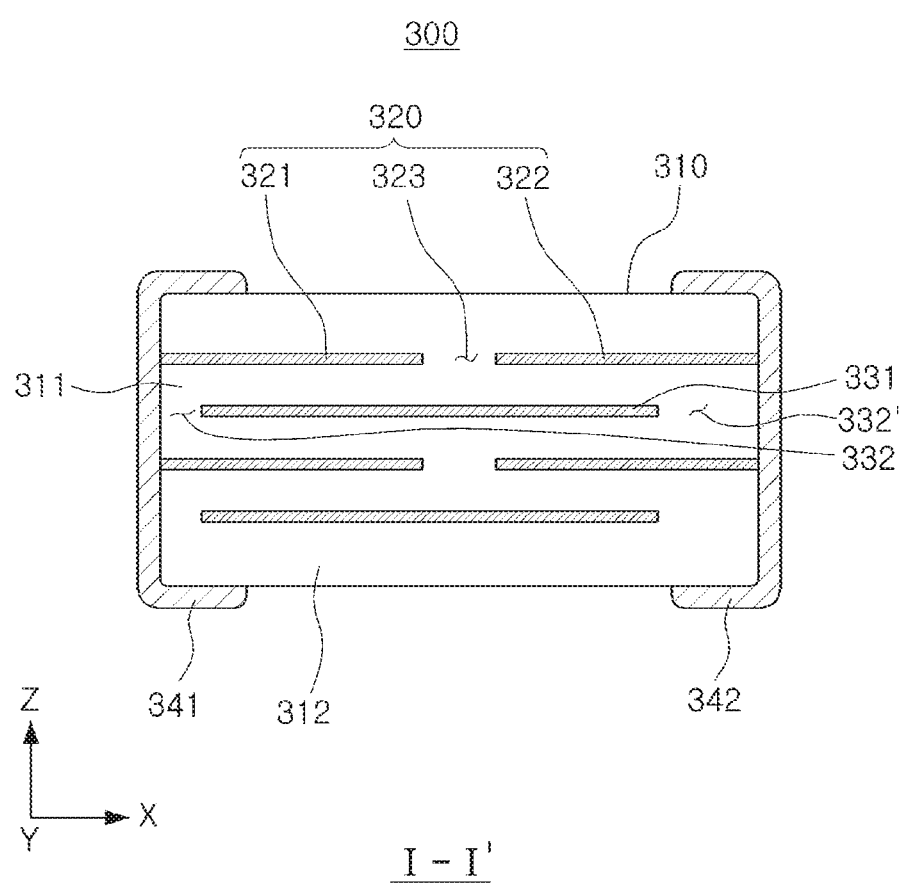
FIG. 6 is a cross-sectional diagram of a multilayer capacitor according to another exemplary embodiment in the present disclosure, taken along line I-I'.
Figure 7A:
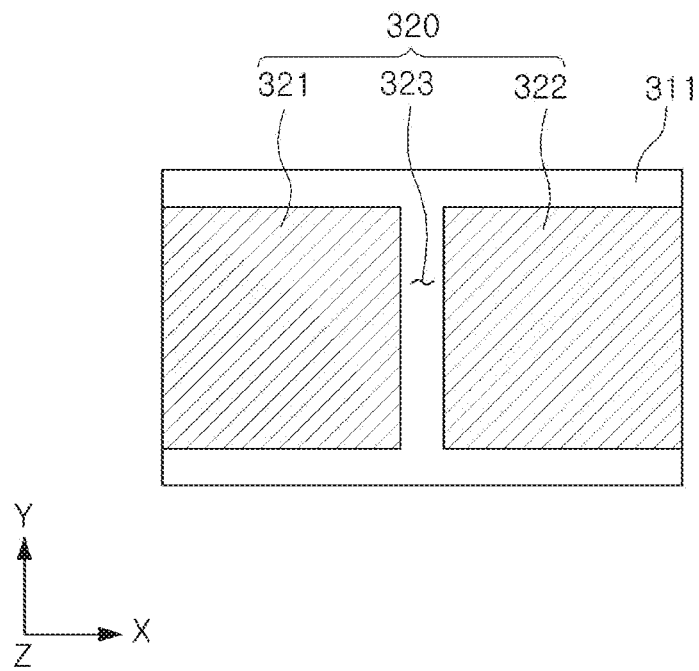
FIG. 7A is a diagram illustrating a ceramic sheet for forming a first internal electrode layer of FIG. 6.
Figure 7B:
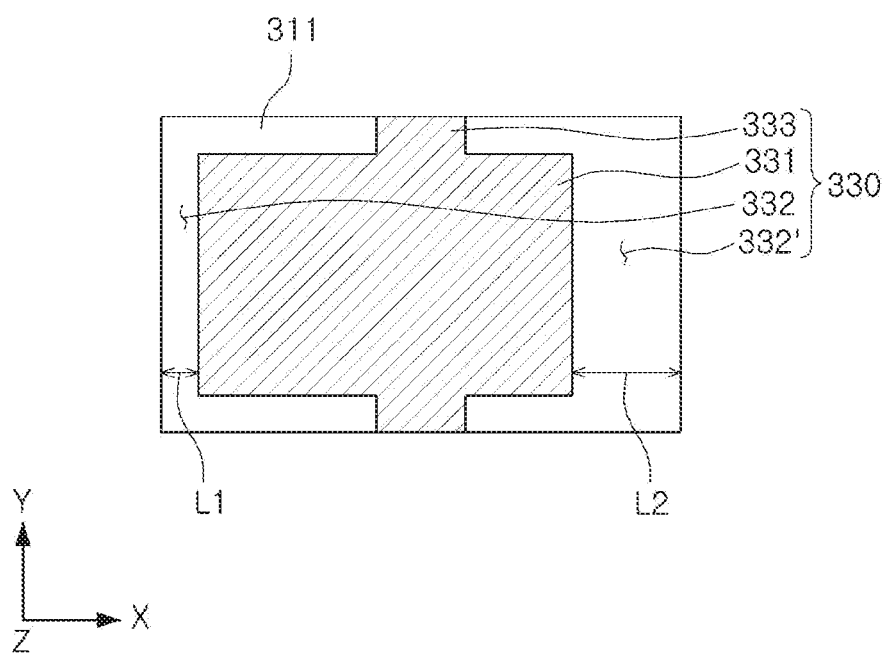
FIG. 7B is a diagram illustrating a ceramic sheet for forming a second internal electrode layer of FIG. 6.
Figure 7C:
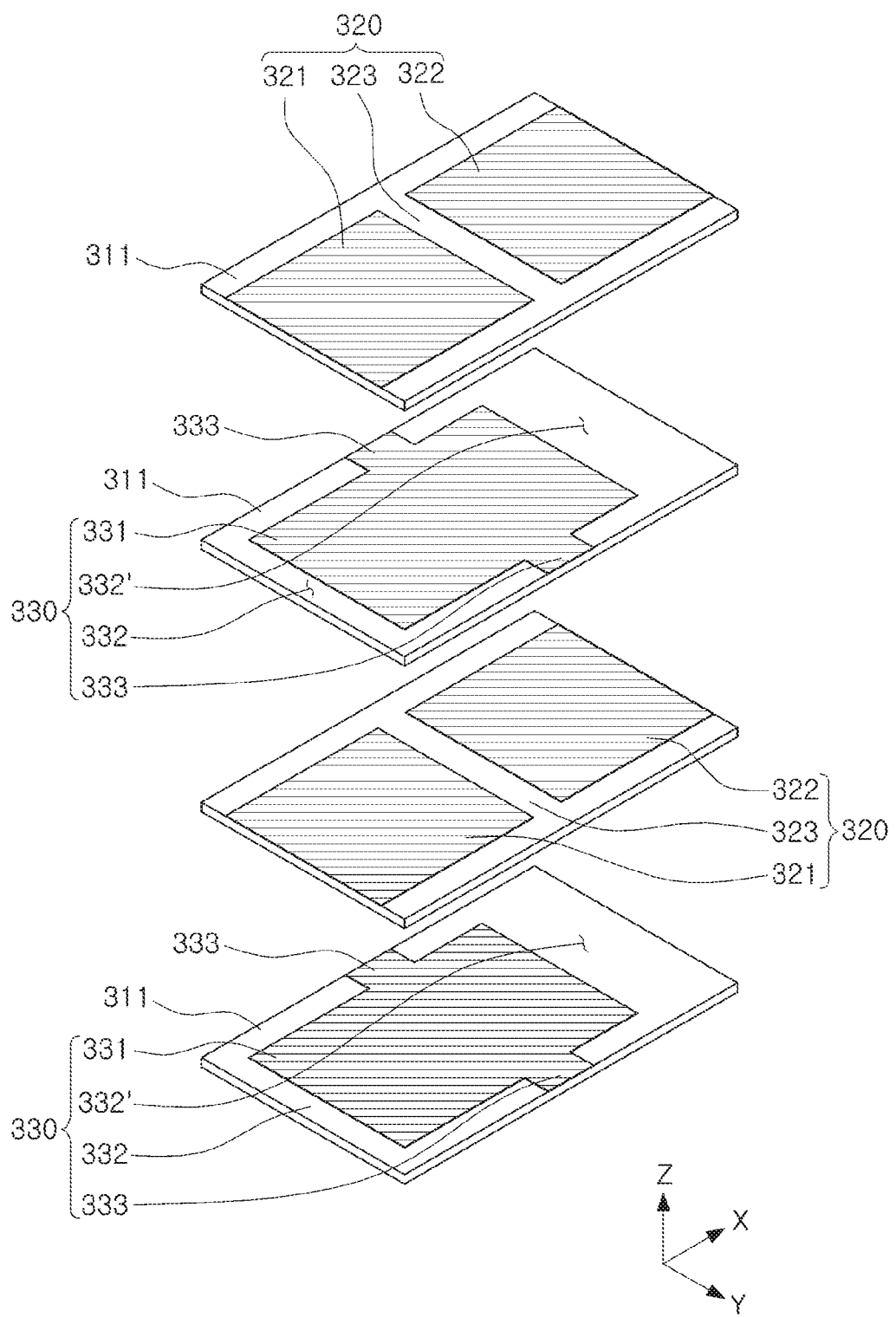
FIG. 7C is a diagram illustrating a stacking method for manufacturing the multilayer capacitor of FIG. 6.

FIG. 6 is a cross-sectional diagram of a multilayer capacitor 300 according to another exemplary embodiment in the present disclosure, taken along line I-I'. FIG. 7A is a diagram illustrating a ceramic sheet for forming a first internal electrode layer of FIG. 6. FIG. 7B is a diagram illustrating a ceramic sheet for forming a second internal electrode layer of FIG. 6. FIG. 7C is a diagram illustrating a stacking method for manufacturing the multilayer capacitor of FIG. 6.

Referring to FIGS. 6 through 7C, a spacing distance L1 between a third internal electrode 331 and a first external electrode 341 may be different from a spacing distance L2 between the third internal electrode 331 and a second external electrode 342.

That is, a second internal electrode layer 330 may include spaces 332 and 332' spaced apart from third and fourth surfaces of a body so that the third internal electrode 331 may be insulated from the first and second external electrodes 341 and 342, and sizes of the spaced spaces 332 and 332' may be different from each other.

Therefore, an area of an overlapping portion between first and third internal electrodes 321 and 331 and an area of an overlapping portion between second and third internal electrodes 322 and 331 may be controlled depending on the desired capacitance.

Figure 8:
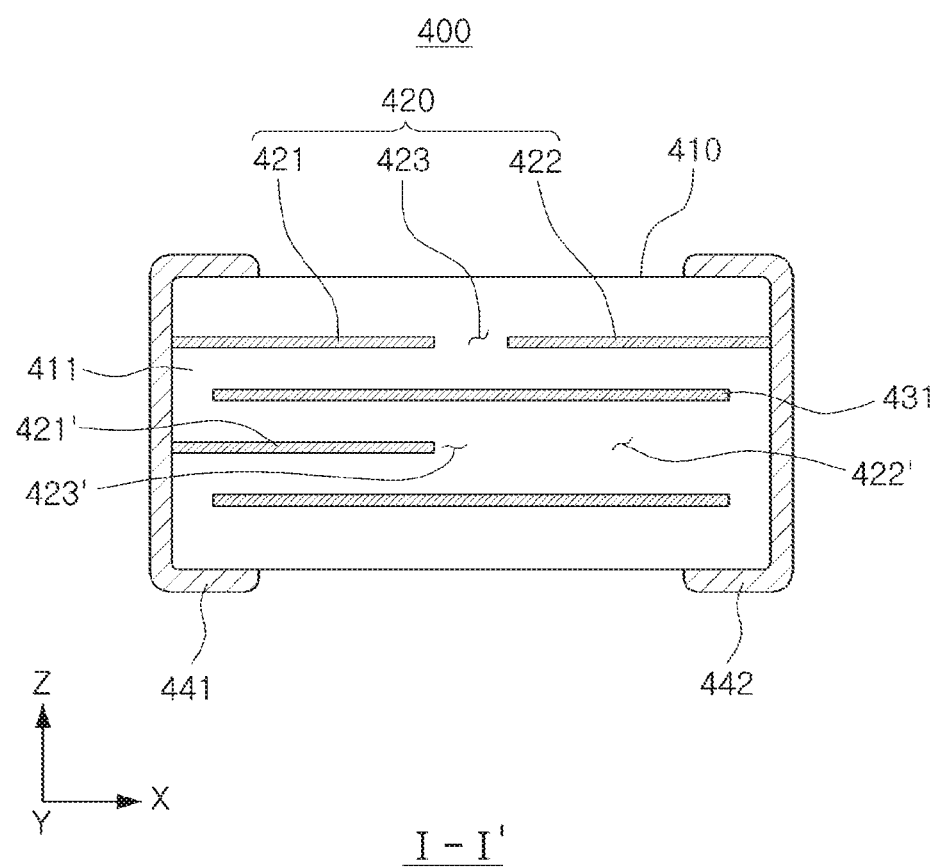
FIG. 8 is a cross-sectional diagram of a multilayer capacitor according to another exemplary embodiment in the present disclosure, taken along line I-I'.
Figure 9A:
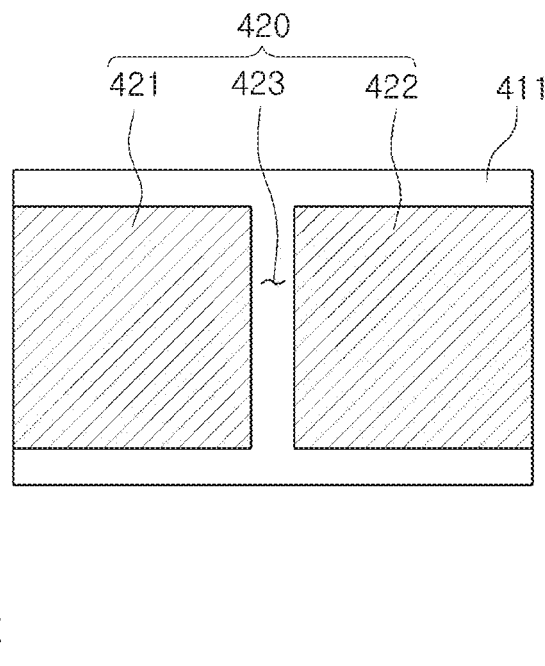
FIG. 9A is a diagram illustrating a ceramic sheet for forming a first internal electrode layer of FIG. 8.
Figure 9B:
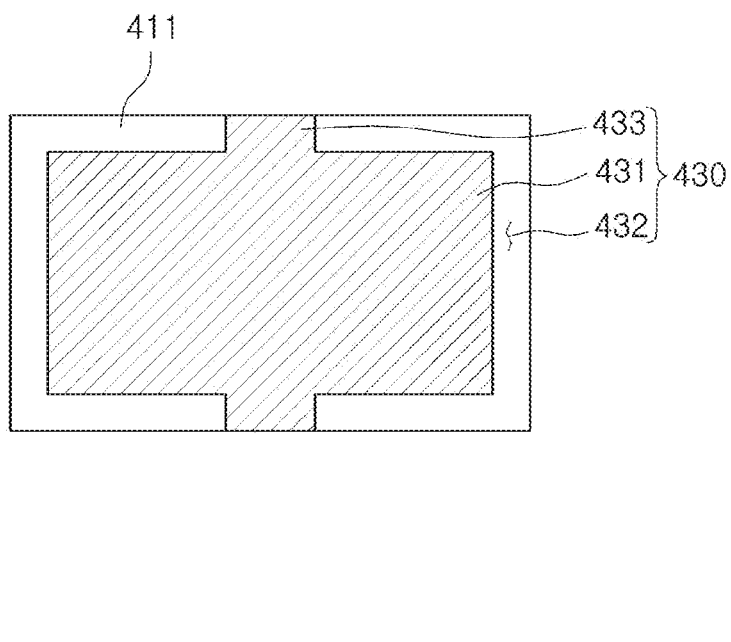
FIG. 9B is a diagram illustrating a ceramic sheet for forming a second internal electrode layer of FIG. 8.
Figure 9C:
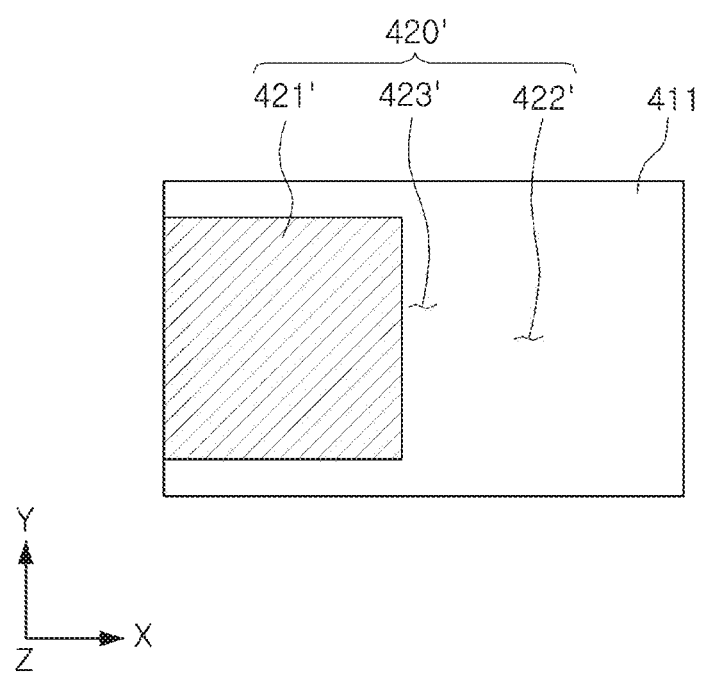
FIG. 9C is a diagram illustrating a ceramic sheet for forming a third internal electrode layer of FIG. 8.
Figure 9D:
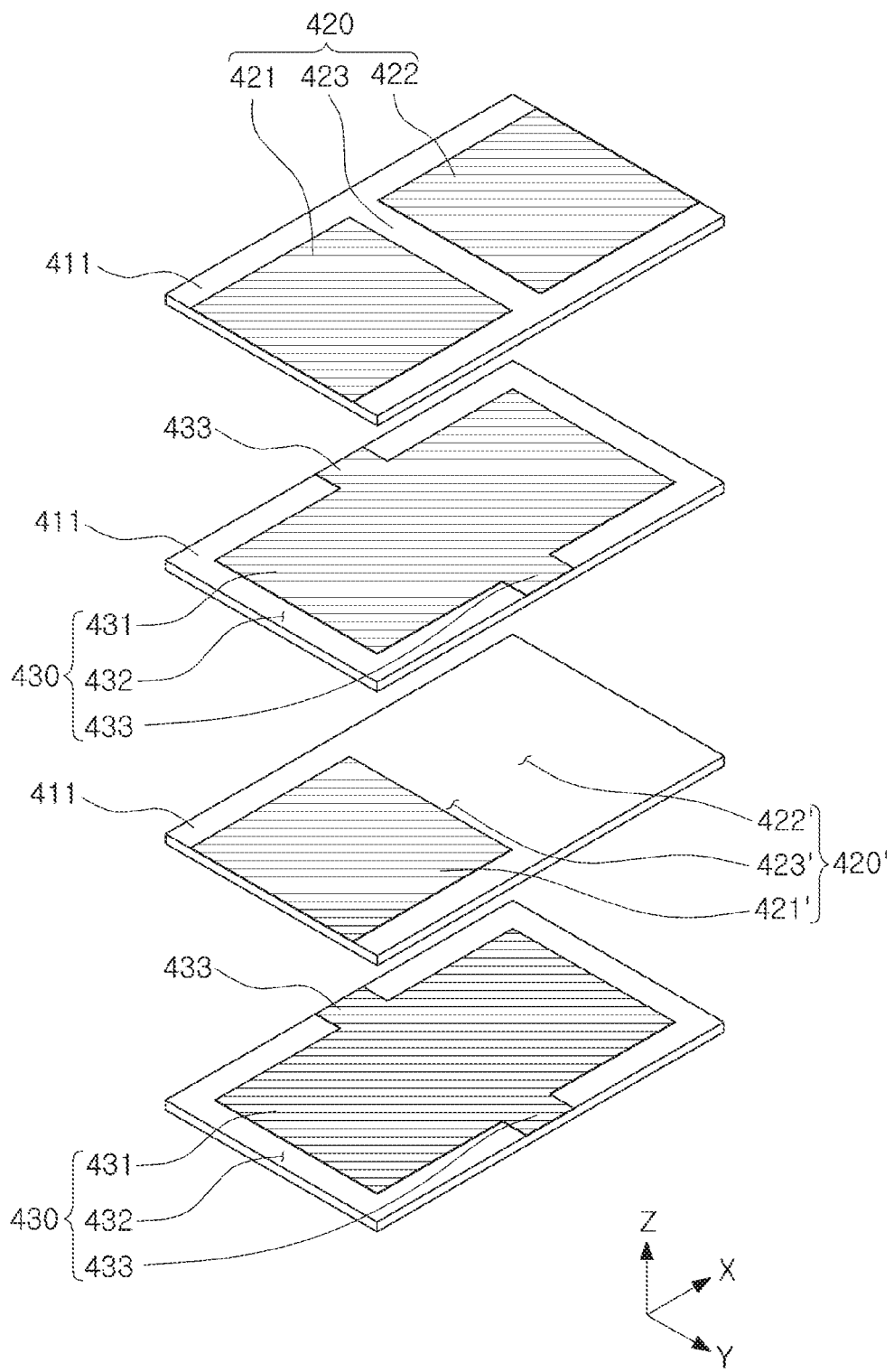
FIG. 9D is a diagram illustrating a stacking method for manufacturing the multilayer capacitor of FIG. 8.

FIG. 8 is a cross-sectional diagram of a multilayer capacitor 400 according to another exemplary embodiment in the present disclosure, taken along line I-I'. FIG. 9A is a diagram illustrating a ceramic sheet for forming a first internal electrode layer of FIG. 8. FIG. 9B is a diagram illustrating a ceramic sheet for forming a second internal electrode layer of FIG. 8. FIG. 9C is a diagram illustrating a ceramic sheet for forming a third internal electrode layer of FIG. 8. FIG. 9D is a diagram illustrating a stacking method for manufacturing the multilayer capacitor of FIG. 8.

The multilayer capacitor 400 may have the same effect as connecting two capacitors having different capacitances to each other by changing at least one of a plurality of stacked first internal electrode layers 420 to a third internal electrode layer 420' as illustrated in FIGS. 8 through 9D.

The third internal electrode layer 420' may have a structure in which only one of first and second internal electrodes 421 and 422 is formed.

A multilayer capacitor 500 according to another exemplary embodiment in the present disclosure may include: a first internal electrode layer including first and second internal electrodes disposed to face each other with a first insulating portion interposed therebetween; a second internal electrode layer including a third internal electrode and a lead portion connected to the third internal electrode; a third internal electrode layer including a dummy electrode and a fourth internal electrode disposed to face each other with a second insulating portion interposed therebetween; a body including the first, second and third internal electrode layers alternately disposed with respective dielectric layers interposed therebetween; a first external electrode disposed on the body to be connected to the first internal electrode; a second external electrode disposed on the body to be connected to the second and fourth internal electrodes; and a third external electrode disposed on the body to be connected to the lead portion, wherein the dummy electrode is insulated from the first, second and third external electrodes.

Figure 10:
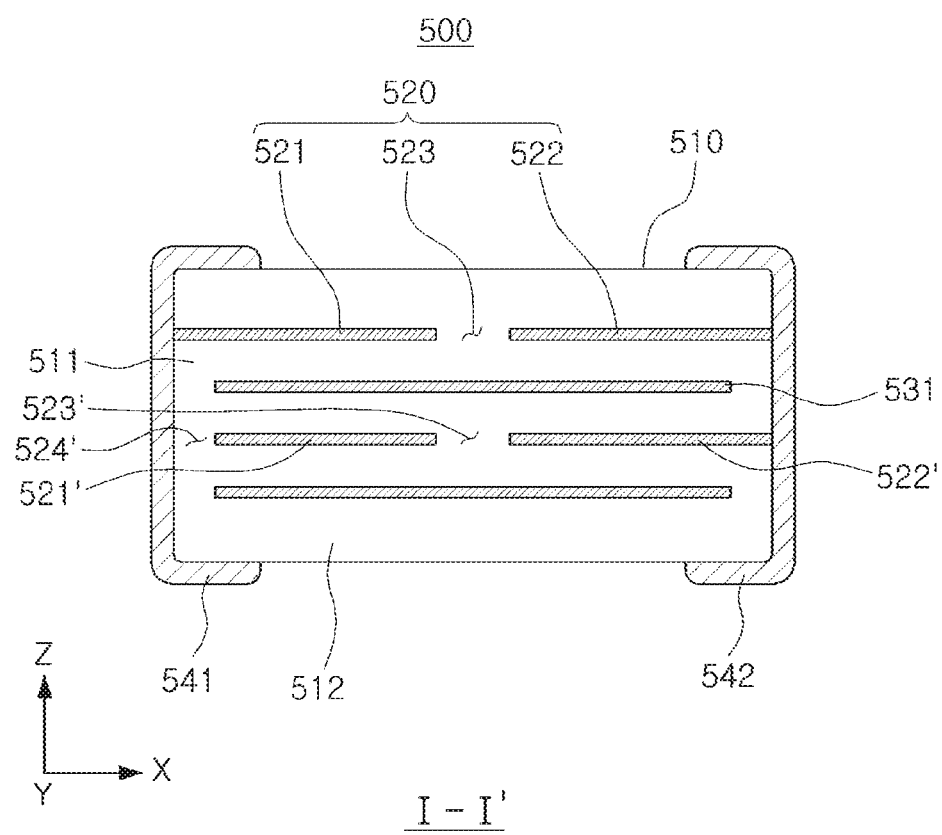
FIG. 10 is a cross-sectional diagram of a multilayer capacitor according to another exemplary embodiment in the present disclosure, taken along line I-I'.
Figure 11A:
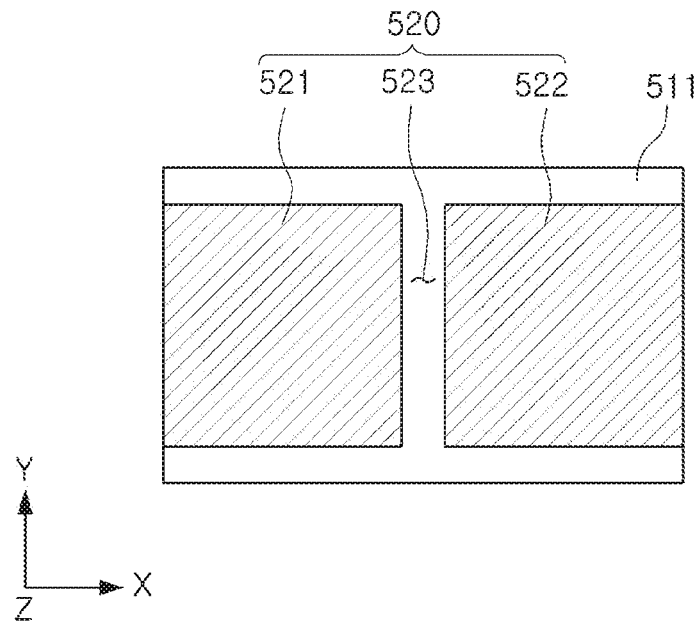
FIG. 11A is a diagram illustrating a ceramic sheet for forming a first internal electrode layer of FIG. 10.
Figure 11B:
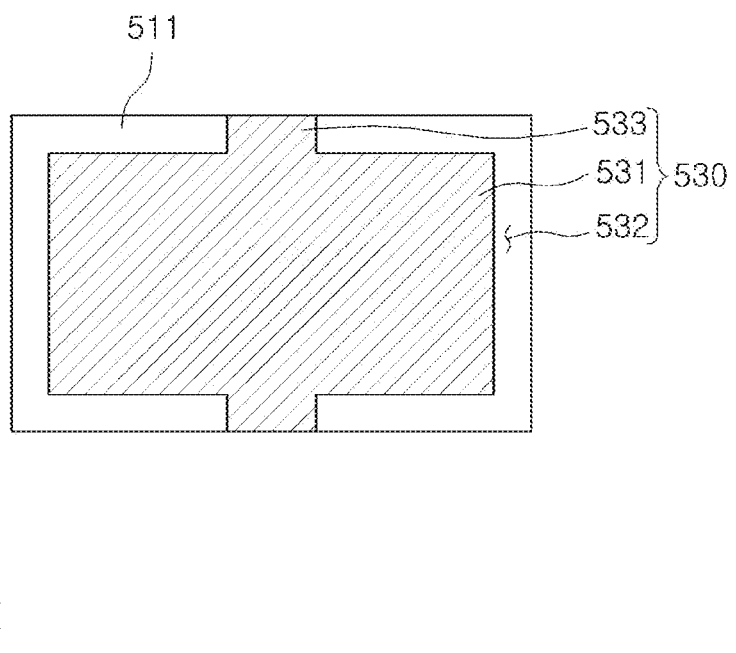
FIG. 11B is a diagram illustrating a ceramic sheet for forming a second internal electrode layer of FIG. 10.
Figure 11C:
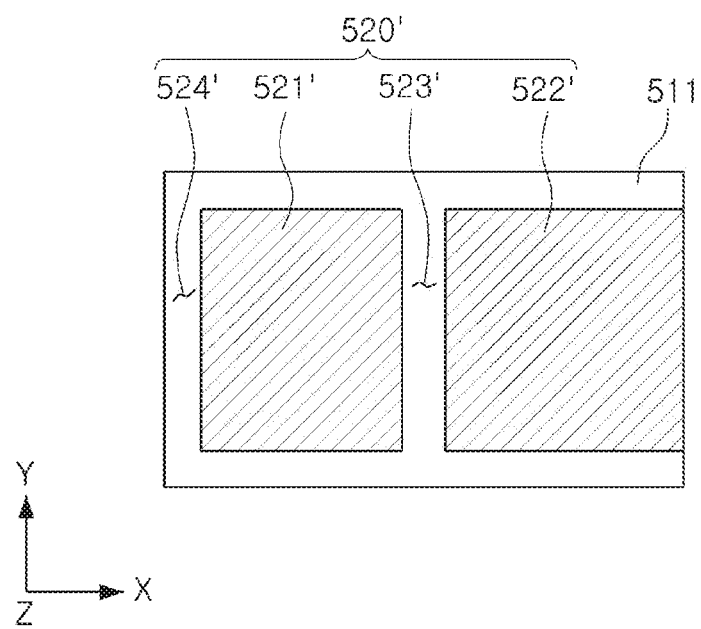
FIG. 11C is a diagram illustrating a ceramic sheet for forming a third internal electrode layer of FIG. 10.
Figure 11D:
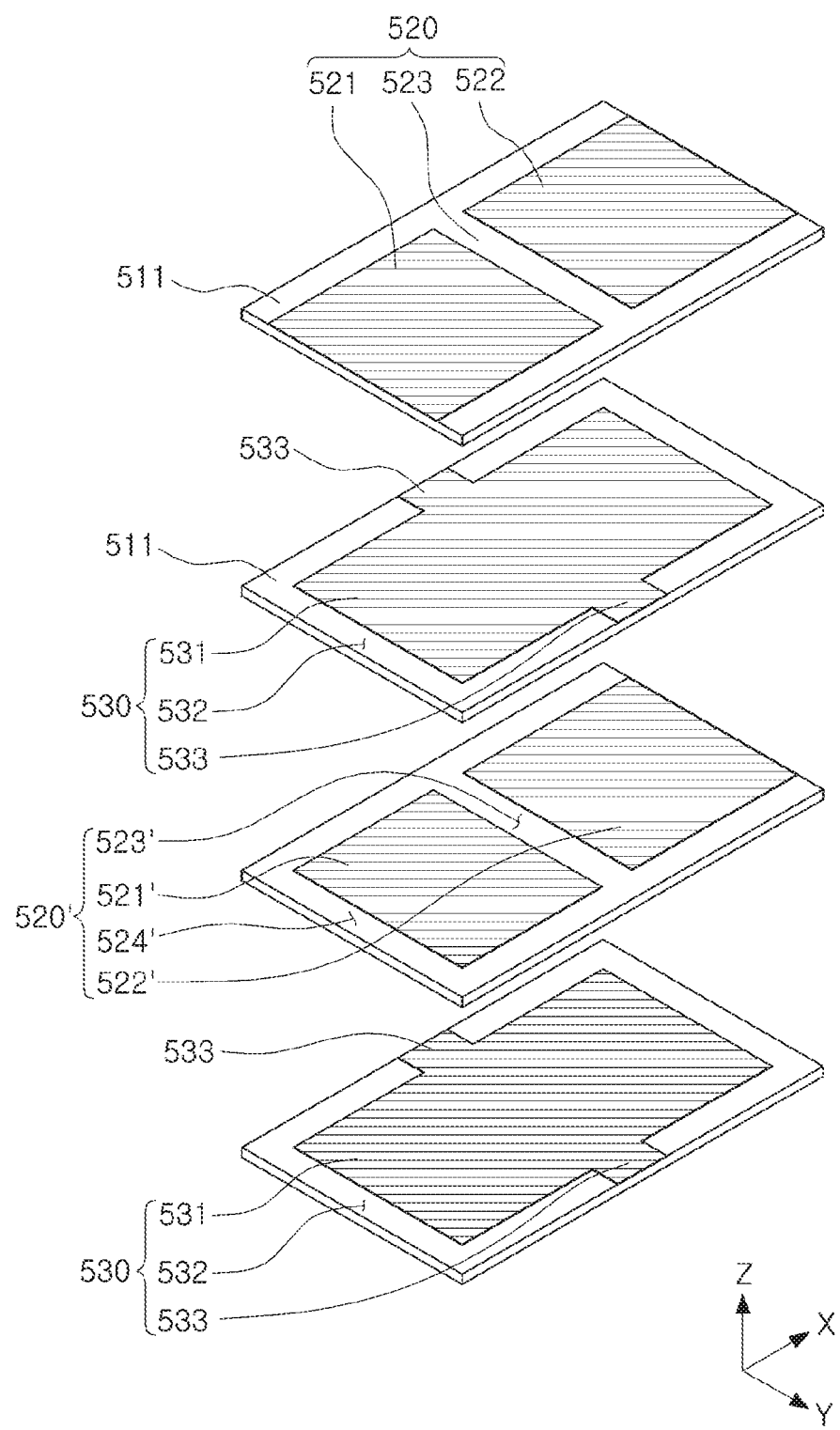
FIG. 11D is a diagram illustrating a stacking method for manufacturing the multilayer capacitor of FIG. 10.

FIG. 10 is a cross-sectional diagram of the multilayer capacitor 500 according to another exemplary embodiment in the present disclosure, taken along line I-I'. FIG. 11A is a diagram illustrating a ceramic sheet for forming the first internal electrode layer of FIG. 10. FIG. 11B is a diagram illustrating a ceramic sheet for forming the second internal electrode layer of FIG. 10. FIG. 11C is a diagram illustrating a ceramic sheet for forming the third internal electrode layer of FIG. 10. FIG. 11D is a diagram illustrating a stacking method for manufacturing the multilayer capacitor of FIG. 10.

Referring to FIG. 10, a first external electrode 541 may be disposed to be connected to a first internal electrode 521, and a second external electrode 542 may be disposed to be connected to second and fourth internal electrodes 522 and 522'.

A lead portion 533 may be formed by printing a conductive paste containing a conductive metal on a dielectric layer 511 at a predetermined thickness, and be formed to be connected to a third internal electrode 531 and exposed to any one of both surfaces of a body in a width (Y) direction. Here, the lead portion 533 may include a first lead portion connected to the third internal electrode 531 and exposed to a fifth surface 5 of the body and a second lead portion connected to the third internal electrode 531 and exposed to a sixth surface 6 of the body, such that the lead portion 533 may be exposed to both surfaces 5 and 6 of the body in the width (Y) direction.

The third internal electrode 531 may be electrically connected to a third external electrode 543 formed on a body 510 through the lead portion 533.

The lead portion 533 may be exposed to any one of both surfaces 5 and 6 of the body 510 in the width (Y) direction, and an exposure position thereof may be biased toward a third or fourth surface 3 or 4 of the body 510. Therefore, the third external electrode 543 connected to the lead portion 533 may also be formed in a position biased toward the third or fourth surface 3 or 4 of the body 510. Therefore, capacitance may be easily distinguished depending on terminal connection.

Referring to FIG. 11A, the first internal electrode layer 520 may include the first and second internal electrodes 521 and 522 disposed to face each other with a first insulating portion 523 interposed therebetween.

Referring to FIG. 11B, a second internal electrode layer 530 of the multilayer capacitor 500 according to another exemplary embodiment in the present disclosure may have the same components as those of the second internal electrode layer 130 according to the exemplary embodiment in the present disclosure described above. Alternatively, the second internal electrode layer 530 may also have the same components as those of the second internal electrode layer 330 according to another exemplary embodiment in the present disclosure described above.

Referring to FIG. 11C, the third internal electrode layer 520' may include a dummy electrode 521' and a fourth internal electrode 522' disposed to face each other with a second insulating portion 523' interposed therebetween. The dummy electrode 521' may be insulated from the first, second and third external electrodes 541 to 543. Since a space 524' spaced apart from the third surface is formed, unlike the first internal electrode 521 of the first internal electrode layer 520, the dummy electrode 521' may be insulated from the first external electrode 541.

Since the dummy electrode 521' is insulated from the first, second and third external electrodes 541 to 543, the dummy electrode 521' does not contribute to forming capacitance, such that the multilayer capacitor 500 according to another exemplary embodiment in the present disclosure may have the same effect as connecting two capacitors having different capacitances to each other.

Further, in a case of controlling capacitance by forming a region 422' in which the internal electrode is not formed as in the multilayer capacitor 400 according to another exemplary embodiment in the present disclosure, as the number of stacked internal electrode layers is increased, there is a risk that a stacking defect depending on the thickness of the internal electrode may occur. However, in a case of controlling capacitance by forming the dummy electrode 521', the stacking defect depending on the thickness of the internal electrode may be solved.

As set forth above, according to exemplary embodiments in the present disclosure, the multilayer capacitor having the same effect as connecting two capacitors may be provided, thereby solving a problem that as the capacitor becomes miniaturized, it is difficult to mount the capacitor. Further, the mounting area may be significantly decreased, and the number of mounting processes may be decreased.

In addition, the multilayer capacitor may have the same effect as connecting two capacitors having different capacitances to each other by controlling shapes and positions of the internal electrodes, and thus, a degree of freedom in design may be improved.

While exemplary embodiments have been shown and described above, it will be apparent to those skilled in the art that modifications and variations could be made without departing from the scope of the present invention as defined by the appended claims.

What is claimed is:

1. A multilayer capacitor comprising:
   a first internal electrode layer including first and second internal electrodes disposed to be spaced apart from each other and separated by an insulating portion interposed therebetween;
   a second internal electrode layer including a third internal electrode and a lead portion connected to the third internal electrode;
   a body including the first and second internal electrode layers alternately disposed in a thickness direction with respective dielectric layers interposed therebetween;
   first and second external electrodes disposed on the body to be connected to the first and second internal electrodes, respectively; and
   a third external electrode disposed on the body to be connected to the lead portion,
   wherein at least a portion of each of the first and second internal electrodes overlaps the third internal electrode in the thickness direction,
   the lead portion and the third external electrode are arranged so as to be biased toward either the first or the second external electrode, and
   an area of overlap between the first and third internal electrodes is different than an area of overlap between the second and third internal electrodes.

2. The multilayer capacitor of claim 1, wherein the first, second and third external electrodes are not connected to each other.

3. The multilayer capacitor of claim 1, wherein an area of an overlapping portion between the first and third internal electrodes is different from an area of an overlapping portion between the second and third internal electrodes.

4. The multilayer capacitor of claim 1, wherein an area of the first internal electrode is different from an area of the second internal electrode.

5. The multilayer capacitor of claim 1, wherein a spacing distance between the third internal electrode and the first external electrode is different from a spacing distance between the third internal electrode and the second external electrode.

6. The multilayer capacitor of claim 1, wherein the first internal electrode is exposed to one of both surfaces of the body in a length direction, and the second internal electrode is exposed to the other surface of the body opposing the surface thereof to which the first internal electrode is exposed.

7. The multilayer capacitor of claim 1, wherein the lead portion is disposed to be exposed to one of both surfaces of the body in a width direction and connected to the third external electrode.

8. The multilayer capacitor of claim 1, wherein the third external electrode is disposed on at least one of both surfaces of the body in a width direction.

9. The multilayer capacitor of claim 1, wherein the first and second external electrodes are disposed to face each other on both surfaces of the body in a length direction.

10. The multilayer capacitor of claim 9, wherein the third external electrode is formed to enclose surfaces of the body except for both surfaces of the body in the length direction and be spaced apart from the first and second external electrodes.

11. A multilayer capacitor comprising:
a first internal electrode layer including first and second internal electrodes disposed to face each other with a first insulating portion interposed therebetween;
a second internal electrode layer including a third internal electrode and a lead portion connected to the third internal electrode;
a third internal electrode layer including a dummy electrode and a fourth internal electrode disposed to face each other with a second insulating portion interposed therebetween;
a body including the first, second and third internal electrode layers alternately disposed in a thickness direction with respective dielectric layers interposed therebetween;
a first external electrode disposed on the body to be connected to the first internal electrode;
a second external electrode disposed on the body to be connected to the second and fourth internal electrodes; and
a third external electrode disposed on the body to be connected to the lead portion, wherein the dummy electrode is insulated from the first, second and third external electrodes.

12. The multilayer capacitor of claim 11, wherein the first, second and third external electrodes are insulated from each other.

13. The multilayer capacitor of claim 11, wherein the first internal electrode is exposed to one of both surfaces of the body in a length direction, and the second internal electrode is exposed to the other surface of the body opposing the surface thereof to which the first internal electrode is exposed.

14. The multilayer capacitor of claim 11, wherein the lead portion is disposed to be exposed to one of both surfaces of the body in a width direction and connected to the third external electrode.

15. The multilayer capacitor of claim 11, wherein the third external electrode is disposed on at least one of both surfaces of the body in a width direction.

16. The multilayer capacitor of claim 11, wherein at least a portion of the dummy electrode overlaps the third internal electrode in the thickness direction.

17. A multilayer capacitor comprising:
first dielectric layers;
first internal electrode having a first area disposed on a first surface of each of the first dielectric layers, the first internal electrodes being exposed at a portion of a first edge of the first dielectric layers along a length direction;
second internal electrodes having a second area disposed on the first surface of each of the first dielectric layers, the second internal electrodes being exposed at a portion of a second edge of the first dielectric layers opposing the first edge in the length direction, each of the second internal electrodes being spaced apart from each of the first internal electrodes by an insulating portion;
second dielectric layers each disposed on the first surface of each of the first dielectric layers to cover the first and second internal electrodes;
third internal electrodes disposed on a second surface of each of the second dielectric layers opposite a first surface in contact with one of the first dielectric layer, the third internal electrodes being spaced apart from edges of the second dielectric layers;
lead portions disposed on the second surface of each of the second dielectric layers and in contact with the corresponding third internal electrodes, the lead portion being exposed to at least one edge of the second dielectric layers in a width direction, the lead portions being disposed in a position corresponding to the insulating portions on the corresponding first dielectric layers;
a first external electrode contacting the first internal electrodes and disposed perpendicular to the first edge and extending in a thickness direction;
a second external electrode contacting the second internal electrodes and disposed perpendicular to the second edge and extending in the thickness direction; and
a third external electrode contacting the lead portions and disposed perpendicular to the corresponding edge and extending in the thickness direction and spaced apart from the first and second external electrodes,
wherein at least a portion of each of the first and second internal electrodes overlaps the third internal electrode in the thickness direction,
the lead portion and the third external electrode are arranged so as to be biased toward either the first or the second external electrode, and
an area of overlap between the first and third internal electrodes is different than an area of overlap between the second and third internal electrodes.

18. The multilayer capacitor of claim 17, wherein the first area is different from the second area.

19. The multilayer capacitor of claim 17, further comprising a third dielectric layer disposed on one of the second dielectric layers; and
a dummy electrode disposed on the third dielectric layer at a position corresponding to the first internal electrodes, wherein the dummy electrode is spaced apart from edges of the third dielectric layer.

20. The multilayer capacitor of claim 17, wherein a spacing distance between the third internal electrode and the first external electrode is different from a spacing distance between the third internal electrode and the second external electrode.

21. The multilayer capacitor of claim 17, further comprising a top cover dielectric layer disposed on a topmost of the first or second dielectric layers, and a bottom cover dielectric layer disposed on the bottommost of the first or second dielectric layers.

22. The multilayer capacitor of claim 17, further comprising a third dielectric layer disposed on one of the second dielectric layers; and
    a fourth internal electrode having a first area disposed on the third dielectric layer at a position corresponding to the first internal electrodes.

\* \* \* \* \*